(12) United States Patent
Curtis

(10) Patent No.: US 8,998,022 B2
(45) Date of Patent: Apr. 7, 2015

(54) FOOD STORAGE INSERT

(71) Applicant: Kathleen Curtis, New Cuyama, CA (US)

(72) Inventor: Kathleen Curtis, New Cuyama, CA (US)

(*) Notice: Subject to any disclaimer, the term of this patent is extended or adjusted under 35 U.S.C. 154(b) by 0 days.

(21) Appl. No.: 14/146,379

(22) Filed: Jan. 2, 2014

(65) Prior Publication Data
US 2014/0183203 A1 Jul. 3, 2014

Related U.S. Application Data

(60) Provisional application No. 61/748,211, filed on Jan. 2, 2013.

(51) Int. Cl.
A23L 3/00 (2006.01)
A47J 43/24 (2006.01)
A47J 36/20 (2006.01)
A47J 43/28 (2006.01)
A47J 47/00 (2006.01)

(52) U.S. Cl.
CPC .............. *A23L 3/001* (2013.01); *A47J 43/24* (2013.01); *A47J 36/20* (2013.01); *A47J 43/284* (2013.01); *A47J 47/00* (2013.01)

(58) Field of Classification Search
CPC . B65D 81/3216; B65D 81/3233; A47J 43/24; A47J 43/284; A23L 3/001
USPC ........... 220/528, 573.5, 574.3, 574; 210/248, 210/250, 249, 318, 314, 295
See application file for complete search history.

(56) References Cited

U.S. PATENT DOCUMENTS

| 1,470,199 | A | * | 10/1923 | Small | 220/573.5 |
| 3,756,681 | A | * | 9/1973 | Croston | 312/351 |
| 3,778,516 | A | | 12/1973 | Cornelius | |
| 4,889,619 | A | * | 12/1989 | Lynch | 209/374 |
| 5,271,520 | A | * | 12/1993 | McAfee | 220/529 |
| 5,335,844 | A | | 8/1994 | Young | |
| 5,799,866 | A | * | 9/1998 | Hattem | 229/406 |
| 7,578,428 | B2 | | 8/2009 | Charlton | |
| 2005/0147718 | A1 | * | 7/2005 | Watzke et al. | 426/112 |

* cited by examiner

*Primary Examiner* — Robert J Hicks
(74) *Attorney, Agent, or Firm* — Global Intellectual Property Agency, LLC

(57) ABSTRACT

The present invention describes a food container insert. The device comprises a silicone insert with multiple holes and feet on the bottom to raise the device off of the base of a food container when positioned therein. The device is placed in the bottom of a food container and facilitates the draining of fluids through the holes thereon, thereby preventing any fruit or food products contained therein from spoiling or becoming overly saturated with fluid. This keeps produce or other food separate from fluid and juices while being stored or served, preventing the same from becoming soggy and enabling the container contents to remain fresh for longer periods of time.

12 Claims, 2 Drawing Sheets

FOOD STORAGE INSERT

CROSS REFERENCE TO RELATED APPLICATION

This application claims the benefit of U.S. Provisional Application No. 61/748,211 filed on Jan. 2, 2013, entitled "Juicy Loosey Container Insert." The above identified patent application is herein incorporated by reference in its entirety to provide continuity of disclosure.

BACKGROUND OF THE INVENTION

Field of the Invention

The present invention relates to a food container insert. More specifically the invention relates to device comprising a planar insert having a plurality of drainage holes thereon, along with feet on the bottom thereof to raise the device from of the base of a food container when placed therein. The insert is adapted for preserving fruits or similar foods that contain high amounts of water.

Traditional methods of storing foods in refrigerators involve placing the food within a sealable container. These containers may come in the form of plastic bags and more rigid, sealable containers. Containers are necessary for preventing contamination of stored foods, whereby the containers create a barrier between the stored items therein and the outside environment. They are also particularly advantageous because they are capable of preserving the flavor and freshness of foods when placed in a refrigerator for a given period of time. Containers of this type are well known in the art and are provided in many shapes and sizes to be of used for storing food products.

Storage containers are commonly used for storing a variety of foods including that of meats, fish, poultry, fruits, and vegetables. But while most foods are capable of being stored for long periods while maintaining their freshness, others tend to lose their flavor or take on the flavors of the other foods around them when stored in a single container. Foods that are vulnerable to flavor loss and/or taking on the flavors of other foods are fruits, particularly those that have been previously cut open and stored for the purpose of creating a fruit salad. Fruit salads usually contain an assortment high liquid-containing fruits, including that of grapes, strawberries, pineapples, watermelons, cantaloupe and cherries, whereby after being cut and decoratively prepared, they are stored in a single container.

A drawback of storing high juice-yielding fruits in the same container is that these fruits tend to release their juices after being cut, which results in a collection of the fruits juices at the bottom of the container. Not only does this cause the fruits to lose their crispness from the oversaturation of the fruit at the bottom of the container, but these foods may also spoil faster. Furthermore, when taking fruit salad or other foods with a lot of juices from a serving dish to a plate, people usually end up with a puddle of juice on their plates. As a result this can lead to undesirable flavor mixing and messes.

There are several devices that attempt to preserve foods in the prior art. These devices are provided in the form of food containers and food container inserts; however, these containers fail to address the setbacks of storing a variety of fruits or juice-yielding food products in a single container, whereby they fail to keep the juices separate from the fruits at the bottom of the container.

The present invention pertains to a new and improved storage insert configured for separating fruit and other foods from juices that reside at a bottom of a container. This is accomplished without compromising ability of the storage containers to preserve foods, whereby the insert has a plurality of apertures that facilitate the communication of juices therethrough and from the fruit. A plurality of legs provides an offset between the supported fruit and the bottom of the container, thereby preventing any fruit contained therein from interacting with the collected juices and spoiling. Overall, the device is provided for use in improving storage and preservation of fruits within containers.

DESCRIPTION OF THE PRIOR ART

Devices have been disclosed in the prior art that relate to food preservers. These include devices that have been patented and published in patent application publications. These devices generally relate to food containers and container inserts. The following is a list of devices deemed most relevant to the present disclosure, which are herein described for the purposes of highlighting and differentiating the unique aspects of the present invention, and further highlighting the drawbacks existing in the prior art.

Devices of the prior art largely relate to storage containers adapted for containing fruits, or food container inserts having apertures configured for liquid separation. These devices, however, are limiting in that they fail to provide an insert having apertures that facilitate draining of juices therethrough, and further fail to provide a means of separation between the fruit and the pool of juices located at the bottom of the container. While useful for their own purposes, these items fail to anticipate the food storage insert of the present invention. The present invention prevents the spoiling of food by providing a separation of food and the juices located beneath it, and further is capable of being installed on a variety of container shapes and sizes.

One such device is U.S. Pat. No. 5,799,866 to Hattem, which discloses a household food container, wherein the container includes a bottom wall and sidewalls extending upward to form a cavity therein which contains a removable platform that is capable of supporting food. The Hattem device includes a support structure that supports the removable platform by legs extending downward from the platform, however it lacks a device wherein the food support is a singular structure comprising apertures and legs, whereas the legs of Hattem are installed on a separate piece.

Another device is U.S. Pat. No. 7,578,428 to Charlton, which describes a carry-out food container, whereby the container includes a food tray which is freely movable into and out of the container. Although the food container of Charlton comprises an insertable food tray that is similar in nature and relevant to the present invention, it fails to provide an insert including apertures and legs that are adapted to separating the contents within the container from the juices on the bottom of the container similar to that as described by the present invention.

Yet another device is U.S. Pat. No. 5,335,844 to Young, which teaches a fruit and produce container, whereby the device includes a corrugated cardboard container having a bottom, first, and second interlocking members that provide the structural strength of the container to prevent degrading due to moisture. However, although the corrugated cardboard container is capable of transporting wet materials without degrading, its design fails to address the purpose of the present invention, whereby the container of Young fails to provide an elevated platform having apertures configured to separate fruits from a pool of liquid located at the bottom of a container.

Finally, U.S. Pat. No. 3,778,516 to Cornelius describes a fruit container including a set of two containers, whereby one container is insertable inside the base container. The containers are sized so that there may be multiple layers of separated fruits within the container. In operation, the containers of Cornelius are utilized to package fruit in an attractive manner for display and sale, whereas the container of the present invention is for the purpose of separating fruit from the juices that are released and lie at the bottom of the container.

The present invention provides a device that provides a separation between fruit and the juices they release, thereby preventing the fruit from becoming waterlogged and spoiling. The device includes a plastic base having handles, a plurality of apertures, and a plurality of legs adapted to provide a separation between the bottom of a container and the fruit. The device may be made into the form of a variety of sizes to be insertable into different containers. Furthermore, the device can may be made into a variety of shapes including that of circular, square and rectangle for insertion into different shaped containers that may already exist in a household. In this way, the present invention provides a device that preserves the crispness of precut fruits and prevents contact with juices that might waterlog or spoil fruits.

It is submitted that the present invention is substantially divergent in design elements from the prior art and consequently it is clear that there is a need in the art for an improvement to existing fruit storage devices. In this regard the instant invention substantially fulfills these needs.

SUMMARY OF THE INVENTION

In view of the foregoing disadvantages inherent in the known types of food containers now present in the prior art, the present invention provides a new fruit storage container wherein the same can be utilized for providing convenience for a user when the separation of juices from the fruits that release them during storage is desired.

It is therefore an object of the present invention to provide a new and improved food storage device that has all of the advantages of the prior art and none of the disadvantages.

It is another object of the present invention to provide a food storage device comprising an insert having a plurality of apertures disposed thereon, whereby the apertures are adapted to facilitate the drainage of liquids that are released by foods placed on the insert upper surface.

Another object of the present invention is to provide a food storage device comprising a plurality of legs, whereby the legs are adapted to provide separation between food in a container and a collection of juices that reside at the bottom of the container.

Yet another object of the present invention is to provide a food storage device, whereby the device may be constructed in a variety of shapes and sizes for use with different container sizes and types.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
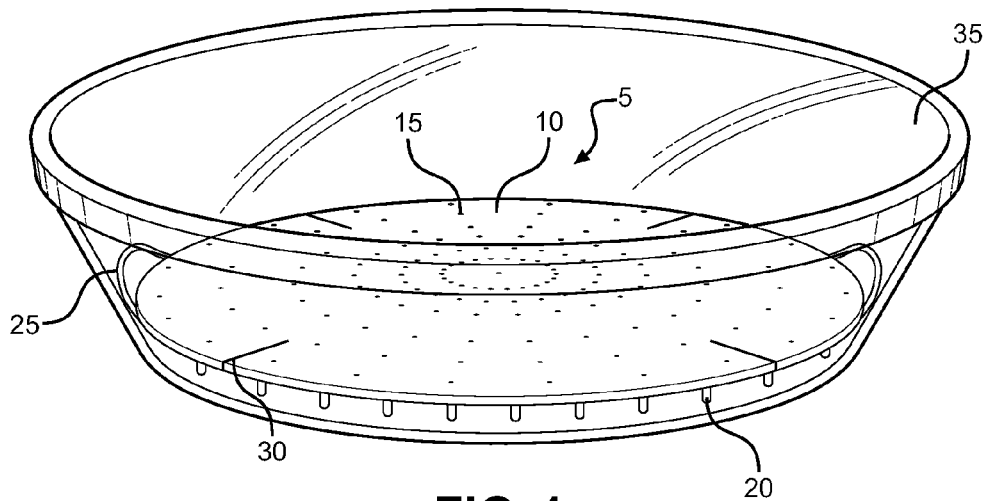
FIG. 1 shows the food storage device of the present invention, whereby the device is placed in a container and is in a working state.

Reference is made herein to the attached drawings. Like reference numerals are used throughout the drawings to depict like or similar elements of the food preservation insert of the present invention. For the purposes of presenting a brief and clear description of the present invention, the preferred embodiment will be discussed as used for the preservation of foods by the separation of the food from their juices that reside along the bottom of a container. The figures are intended for representative purposes only and should not be considered to be limiting in any respect.

The accumulation of juices in and around precut fruit is a common problem for user's who create a fruit salad, which usually includes some combination of cherries, blueberries, grapes, and other precut fruits such as watermelons, apples, oranges, pineapples, peaches, pears, strawberries, cantaloupe, kiwi, and other fruits. While the combination of these fruits in a singular dish may be aesthetically pleasing, the setback of storing these fruits together is that the precut fruits tend to release their juices. The combined accumulation of juices from the fruits may cause the fruits at the bottom of the container to become waterlogged, whereby the fruit adopts the flavors of the combined juices and spoils more rapidly than if stored in a dry environment. The present invention serves to preserve the integrity of the fruits by facilitating the separation of the fruits from the juices that accumulate at the bottom of a container.

Referring now to FIG. 1, there is shown the fruit preservation insert 5 of the present invention, whereby the insert 5 is placed inside of a container 35 for the purpose of separating fruit from a collection juices that accumulate on the bottom of the container 35. The food preservation insert 5 comprises an insert surface 10, having a plurality of apertures 15, a plurality of support legs 20, a pair of handles 25, and longitudinal slits 30 thereon. The present invention comprises a molded assembly and is preferably constructed of a lightweight, flexible, and durable material such as rubber, silicon, plastic, or similar thermoplastic or thermoset polymer.

The insert surface 10 of the food preservation insert is comprised of a flexible and sturdy material, whereby in the preferred embodiment the insert surface is comprised of silicone. The flexibility of the insert is of importance because the property facilitates the insertion of the insert 5 into containers 35 in situations where the shape of the container 35 differs slightly from the outer peripheral edge design of the insert surface 10. Moreover, silicone is desired because it is food safe, dishwasher compatible, and is capable of being molding into a variety of shapes and sizes, thus enabling the use of the insert with a variety of containers 35 without requiring a specialized container specifically for use with the food preservation insert.

Figure 2:
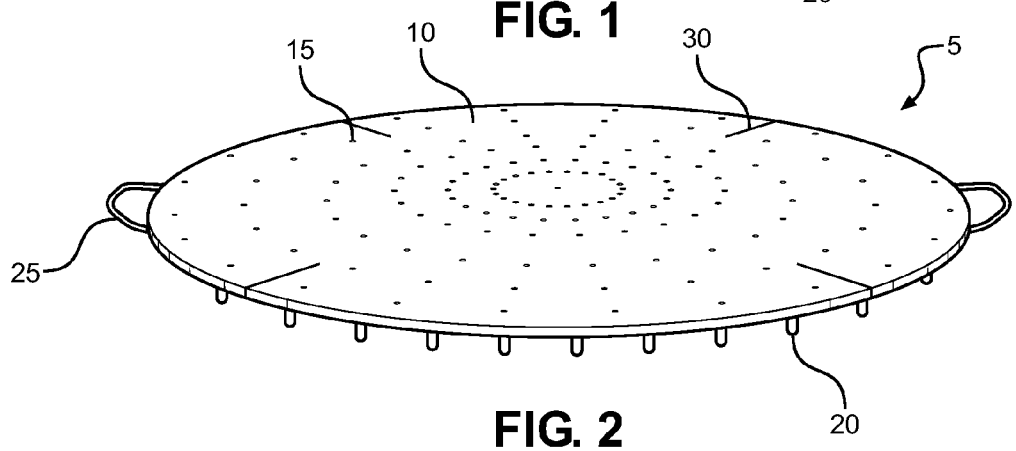
FIG. 2 shows a perspective view of the food storage device of the present invention, whereby the device comprises an insert having a plurality of apertures therethrough and legs configured to offset the food from juices.

Referring now to FIG. 2, there is shown an overhead perspective view of the present invention, with a focus on the apertures 15 on the insert surface 10 of the preservation insert 5. When fruits are precut and stored in a container, they tend to release their juices onto the bottom of a container. This is especially true for high water content fruits such as watermelons and oranges. The apertures 15 of the preservation insert 5 function to facilitate the drainage of the juices of the fruits or any water releasing food, whereby the apertures 15 of the insert surface 10 reduce the quantity of juice that accumulates on and around the food. In the preferred embodiment, the entirety of the surface of the base 10 is covered by a plurality of apertures 15, wherein the amount of apertures 15 covering the surface facilitates the drainage of the juices. Preferably the apertures 15 are designed of a small enough diameter which facilitates the removal of juices while preventing the inclusion of the fruit or portions of the fruit that would create an imprint of the apertures 15 to appear on the fruit. Moreover, the flexibility of the device aids in reducing the pooling of juices between the apertures 15 by facilitating the movement of the juice along the apertures 15.

Furthermore, the plurality of slits 30 positioned along the perimeter of the insert surface 10 provide for increased flexibility to facilitate the insertion of the preservation insert 5 into a container. The slits 30 resemble cuts that extend partially into the insert surface 10, whereby the slits 30 are capable of spreading apart to accommodate particularly shaped containers.

Figure 3:
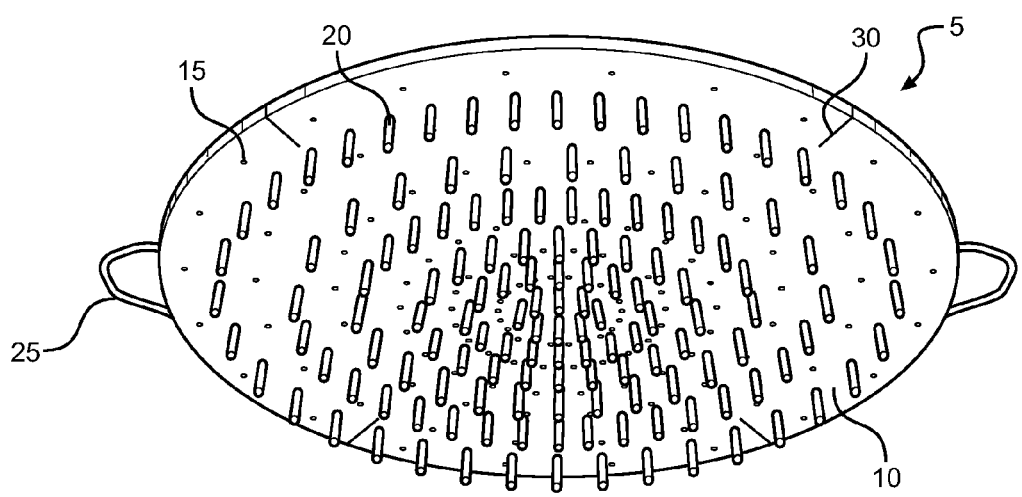
FIG. 3 shows an underside view of the food storage device of the present invention, whereby legs are shown for separating food from underlying juices.

Referring now to FIG. 3, there is shown an underside perspective view of the food preservation device 5 of the present invention, whereby the device comprises a plurality of apertures 15 and legs 20 located on the underside of the insert surface 10. The plurality of legs 20 may be positioned along the underside of the insert surface 10 to facilitate a separation between the fruit and the juices that flow through the apertures 15, whereby the legs include a defined length and density across the insert. The length may be uniform or varied, while the density may be highly populated or sparsely populated across the insert, as defined in the specific design. The legs 20 are of a sufficient hardness to support a plurality of fruits on the insert surface 10 without sacrificing the structural integrity of the legs 20. The legs 20 maintain a separation of the collection of juices that drip through the apertures 15 from the fruit, thereby facilitating the preservation of the fruit and reduces the chances of the fruit becoming waterlogged and spoiling.

Figure 4:
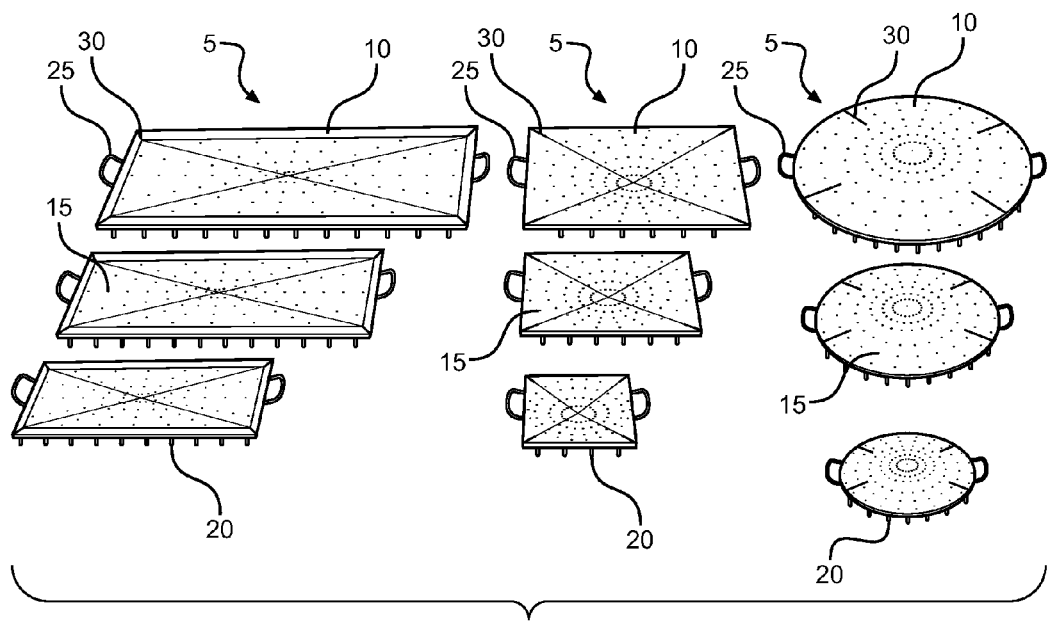
FIG. 4 shows a view of the insert of the present invention, wherein the insert is offered in a variety of sizes and shapes to accommodate different containers.

Referring now to FIG. 4, the food preservation device 5 further includes a pair of handles 25 which are adapted for facilitating the insertion and removal of the food preservation device 5 from a container 35 or similar serving dish. The handles 25 are oppositely positioned along the periphery of the insert surface 10, however, in alternative embodiments there may comprise a plurality of handles 25 positioned around the insert surface 10 of the food preservation device 10. The handles 25 comprise a half-ringed shape having a hollow interior section adapted for the reception of the fingers of a user, whereby the hollow interior provides a gripping location assists in the lifting of the device 5. Moreover, the handles 25 are constructed as part of a singular piece preservation insert 5 mold, however in an alternative embodiment it may be formed separately.

Furthermore, the food preservation insert 5 may be constructed into a variety of different shapes and sizes which better facilitate the insertion of the insert 5 into differently shaped containers. These insert 5 shapes include that of curved or faceted shapes, including circles, ovals, rectangles, squares, and triangles. Moreover, it is contemplated within the scope of the invention to provide an insert surface 10 having additional polygonal configurations, however the inclusion of slits 30 within the sides of the insert surface 10 aid to facilitate insertion of the food preservation insert 5 into a variety of container shapes. Additionally, the inserts 5 are constructed into differing sizes in order to facilitate a fitting into differing sized containers. The slits 30, in combination with the differing shapes and sizes of the inserts 5, facilitates a proper fitting of the inserts 5 into any container that might already exist in a user's household.

Figure 5:
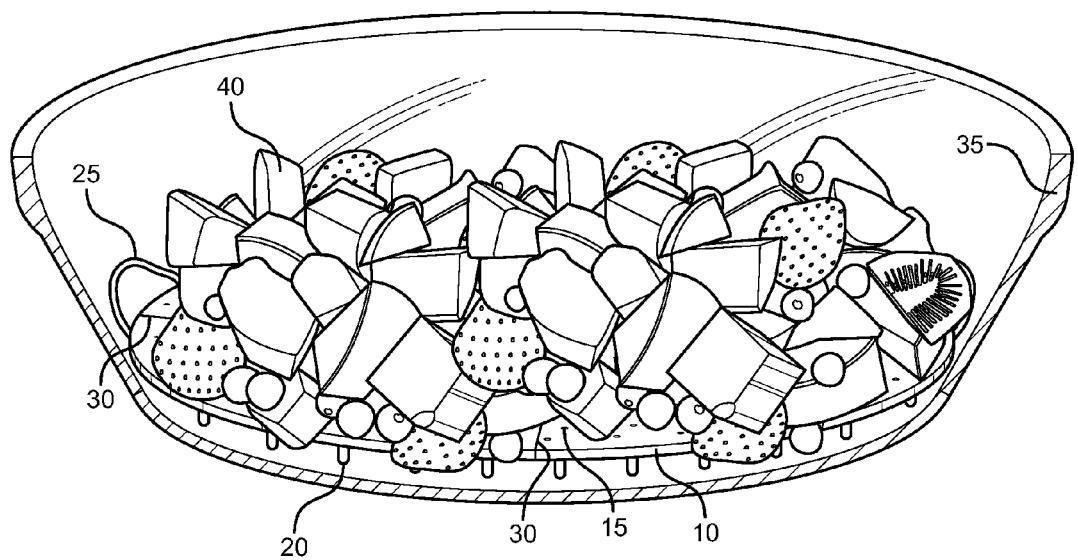
FIG. 5 shows a cross-sectional view of the food preservation device of the present invention in use, wherein the device is within a container and holds a variety of fruit.

Referring now to FIG. 5, there is shown a view of the food preservation insert 5 in use, whereby the insert 5 is placed within a container 35 and is supporting a variety of cut fruit 40, such as that of a fruit salad. The insert 5 comprises a insert surface 10 having a plurality of apertures 15, legs 20, a set of handles 25, and a plurality of slits 30.

In use, after an appropriate container 35 is selected, the user selects a corresponding insert 5 having a similar size and shape, whereby the insert 5 may be circular or polygonal to match the shape of the container 35. For situations where the insert may be slightly larger than the container, the slits 30 positioned around the insert surface 10 flex to enable the insert 5 to be lowered onto the bottom of the container 35, thus facilitating a proper fit.

Next an assortment of fruits 40 are placed on the insert 5 positioned within the container 35. These fruit 40 may be those that hold and release a high amount of juice, such as that of oranges, strawberries, kiwi, and watermelon. The apertures 15 and legs 20 of the insert 5 facilitate the preservation of the fruits 40 by separating the juices that drip to the bottom of a container from the fruit at the bottom of the assortment of fruit. This separation is accomplished by positioning a plurality of apertures 15 around the entirety of the insert surface 10, whereby the apertures 15 facilitate the draining of the juices from the insert surface 10 to a position out of contact with the fruit 40. Furthermore, the legs 20 maintain a 0.5 inch separation between the bottom of a container 35 and the surface of the insert surface 10, thus providing a separation between the fruit and the juices which might cause a change in flavor, waterlog, and possibly spoil the fruit.

Because most of the juices accumulate when stored for a length of time, the present invention is especially useful for situations where the fruits are refrigerated after assembly on the food preservation insert 5. The legs 20 facilitate a separation between the accumulated juices that drip through the apertures 15, thus providing increased freshness to the fruit. Furthermore, because the legs 20 separate the fruit from the juices, the container 35 may be used as a serving dish without concern for people having to drain the juices in order to only obtain the desired fruit. Alternatively, the insert 5 may be removed from the container 35 by the handles 25. Because the fruit 40 is separated from the juices, there is minimal mess when removing the insert 5, thus enabling the insert to be used as a serving tray, or the insert may be placed into another container for displaying the fruit 40.

The present invention is designed for those who desire to create a fruit salad without the issues that accommodate the cutting and storing of high juice content fruits. The food preservation insert 5 of the present invention includes an insert surface 10, having a plurality of apertures 15, plurality of legs 20, a pair of handles 25, and a plurality of slits 30. The insert 5 is constructed to separate fruit from their released juices by providing an insert surface 10 with apertures 15 that facilitate the draining of the juices from the area that contains the fruit. Moreover, the legs 20 provide a separation between the fruit and the juices that have passed through the apertures 15.

The present invention 5 is further designed to provide a compatible fitting with common household containers, whereby the inserts are constructed into a variety of shapes and sizes. The insert surface 10 of the insert 5 additionally comprises a plurality of slits 30 that flex in order to provide a fitting with containers 35 which are slightly smaller than the container 35. In this way, the present invention provides a device that provides a separation between fruit and the juices they release, thereby preventing the fruit from becoming waterlogged and spoiling.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A food storage insert, comprising:
    an insert surface having an upper surface and an underside surface;
    a plurality of apertures disposed through said insert surface;
    a plurality of legs extending from said underside surface;
    at least one handle extending from an edge of said insert surface;
    at least one slit through said insert surface extending from said edge of said insert surface;
    said insert surface comprising a flexible material;
    said at least one slit configured to operably facilitate separation of said insert surface along said edge and across each slit upon being positioned within a container;
    said apertures configured to allow fluid to drain therethrough, and said legs having a height to offset said upper surface from a container base.

2. The food storage insert of claim 1, wherein said at least one handle comprises a pair of handles that are oppositely attached.

3. The food storage insert of claim 1, wherein said at least one slit is adapted to facilitate lowering of the insert into a container of smaller area than said insert surface area.

4. The food storage insert of claim 1, wherein said insert surface further comprises a rounded shape.

5. The food storage insert of claim 1, wherein said insert surface further comprises a faceted shape.

6. The food storage insert of claim 1, wherein said insert surface further comprises a rectangular shape.

7. A food storage insert, comprising:
    an insert surface having an upper surface and an underside surface;
    a plurality of apertures disposed through said insert surface;
    a plurality of legs extending from said underside surface;
    at least one slit through said insert surface extending from an edge of said insert surface;
    said insert surface comprising a flexible material;
    said at least one slit configured to operably facilitate separation of said insert surface along said edge and across each slit upon being positioned within a container;
    said apertures configured to allow fluid to drain therethrough, and said legs having a height to offset said upper surface from a container base.

8. The food storage insert of claim 7, wherein said at least one slit is adapted to facilitate lowering of the insert into a container of smaller area than said insert surface area.

9. The food storage insert of claim 7, wherein said insert surface further comprises a rounded shape.

10. The food storage insert of claim 7, wherein said insert surface further comprises a faceted shape.

11. The food storage insert of claim 7, wherein said insert surface further comprises a rectangular shape.

12. The food storage insert of claim 7, further comprising at least one handle extending from an edge of said insert surface.

* * * * *